(12) United States Patent
Schroeder et al.

(10) Patent No.: US 6,450,687 B1
(45) Date of Patent: *Sep. 17, 2002

(54) LINEAR RAIL SYSTEM HAVING PRELOAD ADJUSTMENT APPARATUS

(75) Inventors: Robert Schroeder, Rockford, IL (US); Anthony P. LaMarca, Sr., Machesney Park, IL (US)

(73) Assignee: Pacific Bearing Company, Roscoe, IL (US)

( * ) Notice: Subject to any disclaimer, the term of this patent is extended or adjusted under 35 U.S.C. 154(b) by 72 days.

This patent is subject to a terminal disclaimer.

(21) Appl. No.: 09/695,620

(22) Filed: Oct. 24, 2000

Related U.S. Application Data (63) Continuation-in-part of application No. 09/211,524, filed on Dec. 14, 1998, now Pat. No. 6,149,308.

(51) Int. Cl.[7] ................................................. F16C 29/04
(52) U.S. Cl. ............................. 384/50; 384/57; 384/58
(58) Field of Search .......................... 384/50, 53, 54, 384/55, 57, 58

(56) References Cited

U.S. PATENT DOCUMENTS

| | | | |
|---|---|---|---|
| 1,923,853 A | 8/1933 | Van Duyn | 384/49 |
| 1,926,828 A | 9/1933 | Van Berkel | 83/713 |
| 2,598,251 A | 5/1952 | Gesner | 384/58 |
| 3,019,072 A | 1/1962 | Bose et al. | 349/29 |
| 3,661,431 A | 5/1972 | Wisecarver | 384/55 |
| 3,925,933 A | 12/1975 | Reuter | 49/409 |
| 4,390,216 A | 6/1983 | Mueller et al. | 384/53 |
| 5,440,999 A | 8/1995 | Dallman et al. | 109/24.1 |
| 5,820,269 A | 10/1998 | Ariga | 384/53 |
| 5,906,439 A | 5/1999 | Lin | 384/53 |

*Primary Examiner*—Thomas R. Hannon
(74) *Attorney, Agent, or Firm*—Leydig, Voit & Mayer, Ltd.

(57) ABSTRACT

A linear rail system having an apparatus for adjusting the preload on the individual rollers of the slider body which provides a linear rail of the type having upper and lower parallel raceways through which a slider body having a number of rollers attached thereto is adapted to axially translate. The rollers are assured contact with the upper and lower raceways while also providing the ability to absorb shocks placed on the slider body.

19 Claims, 8 Drawing Sheets

LINEAR RAIL SYSTEM HAVING PRELOAD ADJUSTMENT APPARATUS

This is a continuation-in-part of U.S. patent application Ser. No. 09/211,524 filed Dec. 14, 1998, U.S. Pat. No. 6,149,308.

FIELD OF THE INVENTION

The present invention generally relates to sliding mechanisms, and more particularly relates to linear sliding mechanisms employing rollers which ride upon rails.

BACKGROUND OF THE INVENTION

Linear slides are used for literally thousands of applications. Some of the most basic applications are found in conventional furniture drawers wherein the linear slide is the mechanism upon which the drawers slide relative to the desk, countertop, or the like. In addition to such furniture applications, linear slides are used in a number of industrial settings, particularly in conjunction with machine tools. Very often a machine bed will need to slide axially back and forth as the machining operation is performed.

With regard to the machine tool application, it can therefore readily be seen by one of ordinary skill in the art that the linear slide mechanism must be fabricated to move along an axis with practically no play or deflection away from the axis of the linear slide. Any such play or movement would necessarily detrimentally effect the machining operation in that the machining operation is typically computer controlled, and any movement in the linear slide mechanism would therefore result in mis-alignment of the machine tool and the workpiece.

With that stated as a background, it can be seen that one possible option would be to fabricate the linear slide mechanism such that the axis of the linear slide maintains a very tight tolerance relative to a desired axis. In other words, the rails of the slide can be manufactured such that a constant distance is maintained therebetween. However, such an option is obviously difficult to meet and increases the cost of fabrication. Moreover, the rails must be continually adjusted as the machine is used over time due to misalignment resulting from heavy loads or shock loads. In addition, the linear rail system can quite often be deformed due to thermal expansion of the machine as it is repeatedly used.

A need therefore exists for a linear slide system which allows the rollers of the sliding body to maintain constant engagement with the raceways of the rail system to thereby ensure that the sliding body linearly translates across the given axis with substantially no deflection.

SUMMARY OF THE INVENTION

It is therefore a primary aim of the present invention to provide a linear slide system which enables the sliding body of the rail system to axially translate across a given axis with substantially no deflection away from the axis.

It is an objective of the present invention to provide a linear rail system with improved rigidity and structure to thereby maintain accuracy of movement under high stress conditions.

It is another objective of the present invention to provide a linear rail system with means for absorbing shock imparted upon the linear rail due to excessive loads, or abrupt stoppages or reversals of direction.

It is still another objective of the present invention to provide a linear rail system with a mechanism for ensuring parallelism between the opposing raceways of the rail.

In accordance with these aims and objectives, it is a feature of the present invention to provide a sliding rail system wherein a moveable body is adapted for axial translation relative to a rail body having first and second opposed raceways. The moveable body has at least one roller which slidable relative to one of the opposed raceways, and adapted to be fixed in position relative to the raceway.

It is another feature of the present invention to provide the aforementioned linear rail system with a second roller biased against the second opposed raceway. Preferably, the second roller is mechanically biased against the second opposed raceway using an elastomeric material to thereby provide a shock absorbing device.

It is still another feature of the present invention to provide a linear rail system with a means for monitoring the relative position of the rollers and adjusting the positions of the rollers depending on the disposition of the rollers relative to the first and second opposed raceways.

In accordance with a preferred embodiment of the present invention, it is a feature to provide a sliding rail assembly comprising an elongated channel, a slider body adapted to linearly translate across the channel, a first roller to the slide, and a positioning member connected to the slider body and selectively engaging the first roller. The channel has upper and lower parallel raceways. The first roller is attached to the slide and engages one of the raceways to facilitate the linear translation of the slide. The positioning member places a vertical force on the roller to vertically position the roller relative to the raceway.

In accordance with another preferred embodiment of the present invention it is a feature to provide a mechanism for adjusting the position of a roller relative to a linear slide having first and second opposed raceways with the linear slide defining a longitudinal axis. The mechanism comprises a slider body adapted to move with the linear slide along the longitudinal axis, a first roller connected to the slider body and adjustable relative to the slider body along a first axis transverse to the longitudinal axis, and a means for positioning the first roller along the first axis, the positioning means placing opposing vertical forces on the first roller.

These and other aims, objectives, and features of the invention will become more apparent from the following detailed description when taken in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
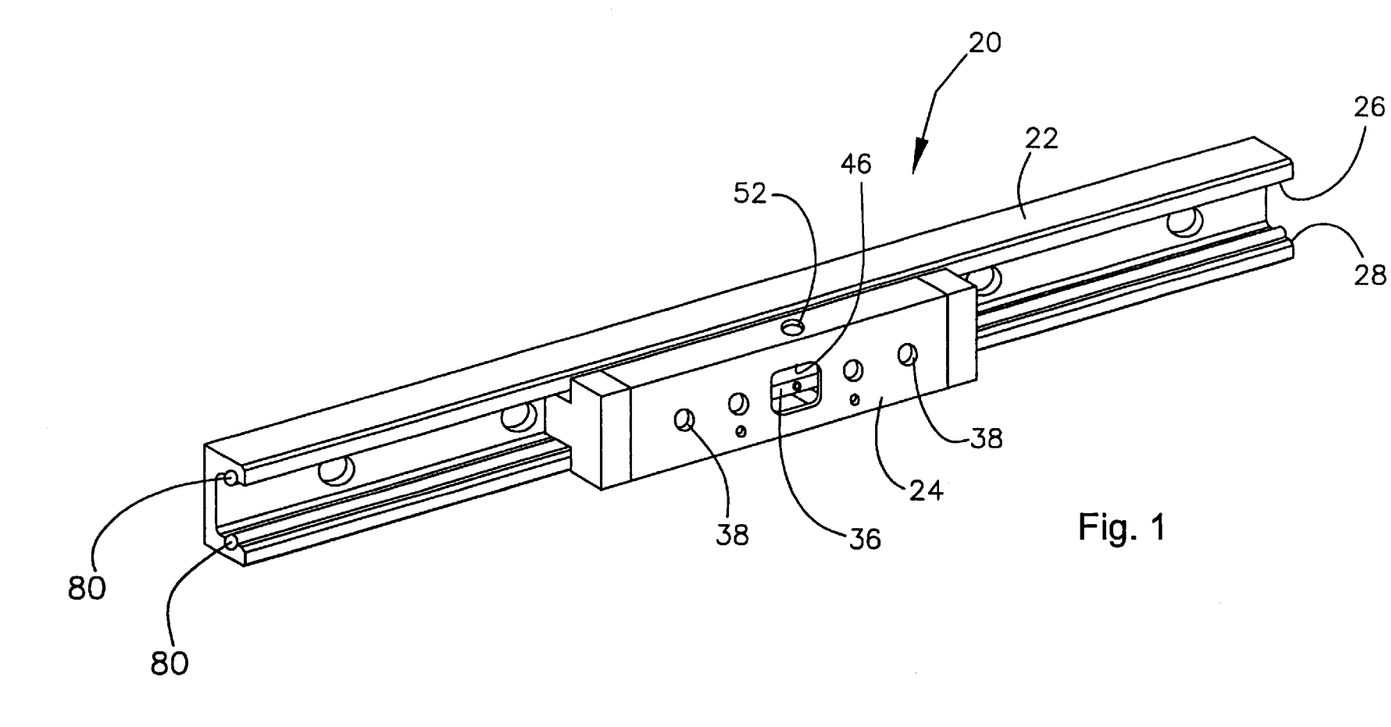
FIG. 1 is a perspective view of the preferred embodiment of the present invention.

Referring now to the drawings and with particular reference to FIG. 1, the preferred embodiment of the present invention is depicted as linear slide system 20. As can be seen from FIG. 1, linear slide 20 primarily consists of linear rail 22 and slider body 24 which is adapted to axially translate across linear rail 22. One of ordinary skill in the art will readily recognize that a pair of linear rails 22 is typically used in most applications and provided in opposing orientation. A platform or other article in need of linear movement can then be attached to the two slider bodies to allow for reciprocating movement.

However, in many applications, it is necessary that the article being moved back and forth across the rails 22 be moved in a perfect or substantially perfect plane with substantially no movement orthogonal to the linear rail. Since the linear rail 22 is comprised of an upper raceway 26 and parallel lower raceway 28 any departure of the raceways from a uniform distance therebetween, will result in undesirable orthogonal movement of the slider body 24. Even if the linear rail 22 is manufactured perfectly, over a period of time, the upper raceway 26 and lower raceway 28 can deflect out of a perfect plane due to excessively high loads, shock loads, or thermal expansion. The present invention therefore provides a slider body 24 with a mechanism for ensuring contact of the rollers of the slider body with upper raceway 26 and lower raceway 28.

Figure 2:
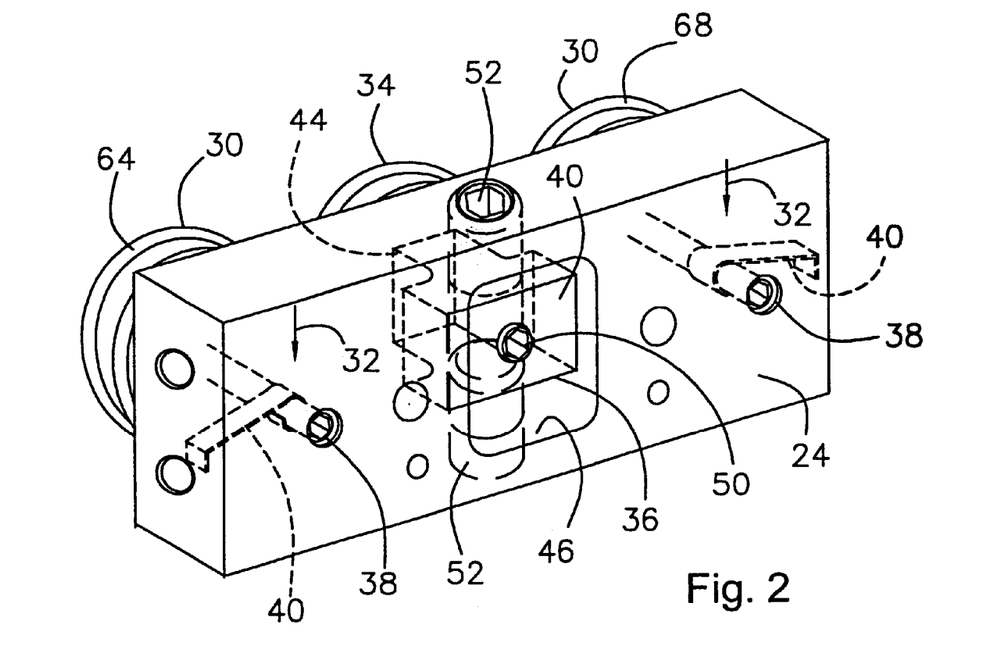
FIG. 2 is a perspective view of the slider body of the preferred embodiment of the present invention.

Referring now to FIG. 2, it can be seen that in the preferred embodiment of the present invention, slider body 24 accomplishes this objective by providing two rollers 30 which are mechanically biased in a downward direction indicated by arrow 32 and a middle roller 34 which is adjustable in the vertical direction by adjustment block 36.

Turning first to outside rollers 30, it can be seen that each roller is mounted onto shaft 38 with shaft 38 being attached to slider body 24 by a mechanical spring 40. It is to be understood that this selection of elements is only used in the preferred embodiment, and that in alternative embodiments, there are other types of biasing means that can be used to generate a downward force upon rollers 30. It is also to be understood that in the preferred embodiment only three rollers are used for each slider body 24, but that in alternative embodiments, a different number of rollers can certainly be employed with equal efficacy using the same basis of the present invention.

Figure 3:
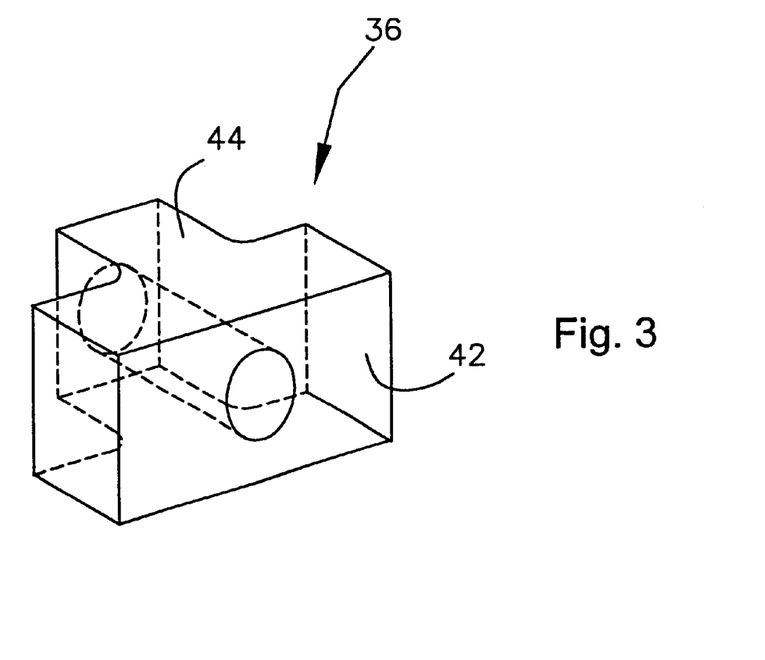
FIG. 3 is a perspective view of the adjustment block of the preferred embodiment of the present invention.
Figure 5:
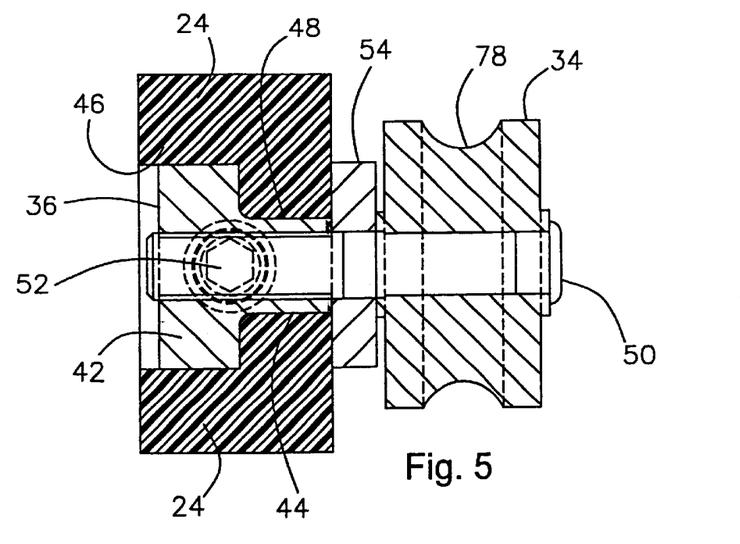
FIG. 5 is a cross-sectional view of the slider body taken along line 5—5 of FIG. 4.

Turning now to the structure of adjustment block 36, it can be seen from FIG. 3 that it is a substantially "T" shaped block having planar portion 42 and rearwardly extending leg 44. Planar portion 42 is sized to fit into notch 46 of slider body 24, while leg 44 is proportionately smaller in size to fit into vertical slot 48 (FIG. 5). In so doing, adjustment block 36 is adapted for vertical movement as leg 44 slides within slot 48. By moving adjustment block 36 in a vertical direction, roller 34 is also moved in a vertical direction since middle roller 34 is attached to adjustment block 36 using stud 50. The relative position of adjustment block 36 within notch 46 can be adjusted using set screws 52. More specifically, by rotation of one set screw 52 in a clockwise direction and the other set screw 52 in a counter-clockwise direction, the position of adjustment block 36 can be modified. For the sake of complete clarity, it can be seen from FIG. 5 that a spacer or washer 54 separates roller 34 from adjustment block 36 and from slider body 24. In alternative embodiments, position adjustment means other than set screws can be employed, such as wedges, cams, spacers, solenoids, piezoelectric mechanisms, rack and pinion and springs.

In so doing, the present invention provides a mechanism by which contact between rollers 30 and roller 34 with lower raceway 28 and upper raceway 26, respectively, can be ensured regardless of the parallelism between upper raceway 26 and lower raceway 28. Moreover, by attaching rollers 30 to slider body 24 using mechanical springs 40 a certain degree of elasticity is provided which enables the slider body 24 to absorb considerable shock loads. It is to be understood that while the preferred embodiment uses mechanical springs 40 manufactured from metal, any type of elastomeric material can be used provided it has sufficient rigidity to support the weight to be carried by slider body 24.

In addition, by providing middle roller 34 on adjustment block 36, the entire system 20 can be preloaded to ensure proper functioning of the system. With the proper amount of preload, the slide system can add rigidity but still maintain a smooth actuation and low co-efficient of friction. A properly set, rigid preload setting is difficult to manufacture into a slide system because of, inter alia, tolerance stack ups, so a means of adjusting the preload is necessary. Moreover, by providing a small gap between the bottom of the adjustment block and rolling device the rolling device is tightened against the housing material and not the adjustment block. This creates a very rigid mount for the rolling device.

Figure 7:
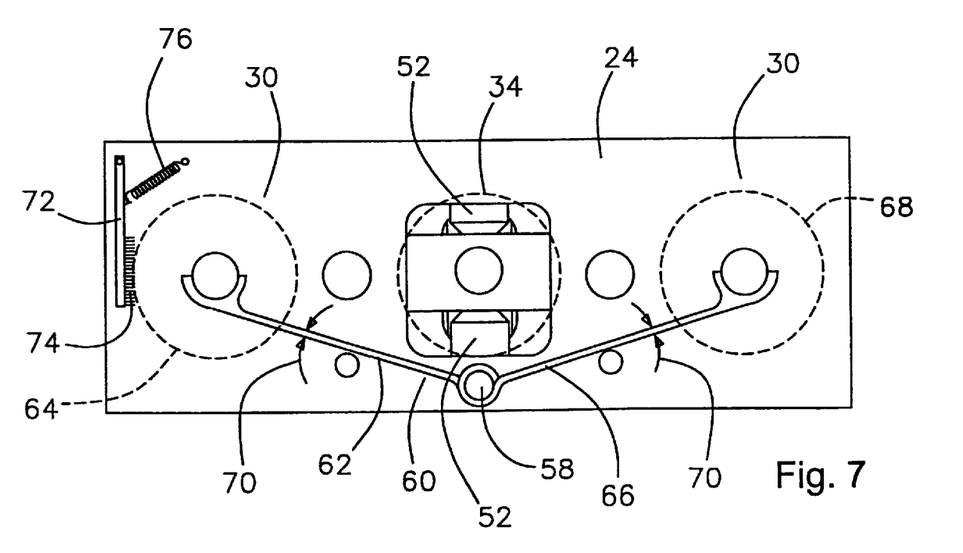
FIG. 7 is a side view of an alternative embodiment of the present invention.

Turning now to an alternative embodiment, attention is directed to FIG. 7 which depicts a side view of alternative slider body 24. The alternative embodiment uses the identical adjustment block arrangement discussed above, but provides a different means for elastically mounting outside rollers 30. In the alternative embodiment, rollers 30 are mounted using a coil spring mounted about pivot 58. The coil spring 60 has first leg 62 adapted to mount first roller 64, while coil spring 60 also has a second leg 66 for mounting a third roller 68 as indicated by bi-directional arrows 70. First roller 64 and third roller 68 are therefore allowed a certain degree of vertical play to accept fairly substantial shock loads.

Figure 6:
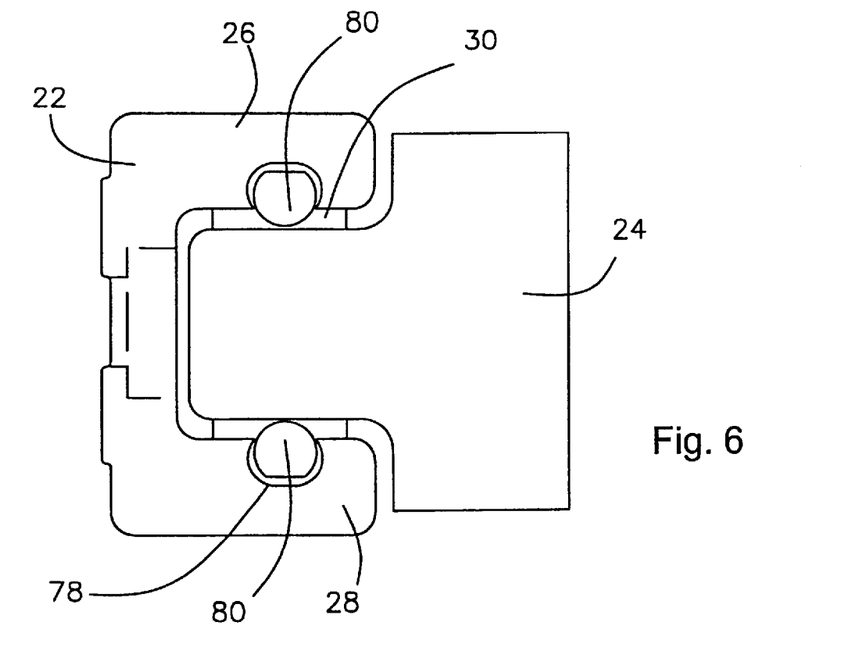
FIG. 6 is an end view of the embodiment shown in FIG. 1.

Also in the alternative embodiment, a brush 72 is provided with abrasive surface 74 to clean rollers 30. It can be seen that brush 72 is spring biased toward rollers 30 using spring 76 to ensure proper and sufficient load against rollers 30 for adequately cleaning purposes. This is of importance, because as can be seen from FIGS. 5 and 6, each roller 30 is provided with an annular groove 78 which is sized to receive hardened raceway insert 80. Any contaminants provided between the roller and raceway will necessarily effect the accuracy of the linear slide system 20.

As indicated above, one factor which can effect the accuracy of the system 20 is rail misalignment or loss of parallelism due to use over time. One feature which the present invention provides to avoid such expansion is the use of hardened raceway inserts 80. In the preferred embodiment of the present invention the raceways are manufactured of hardened steel while rollers are manufactured with 52100 steel. Rails 22 are preferably manufactured of 6061-T6 aluminum as are slider bodies 24.

Figure 8A:
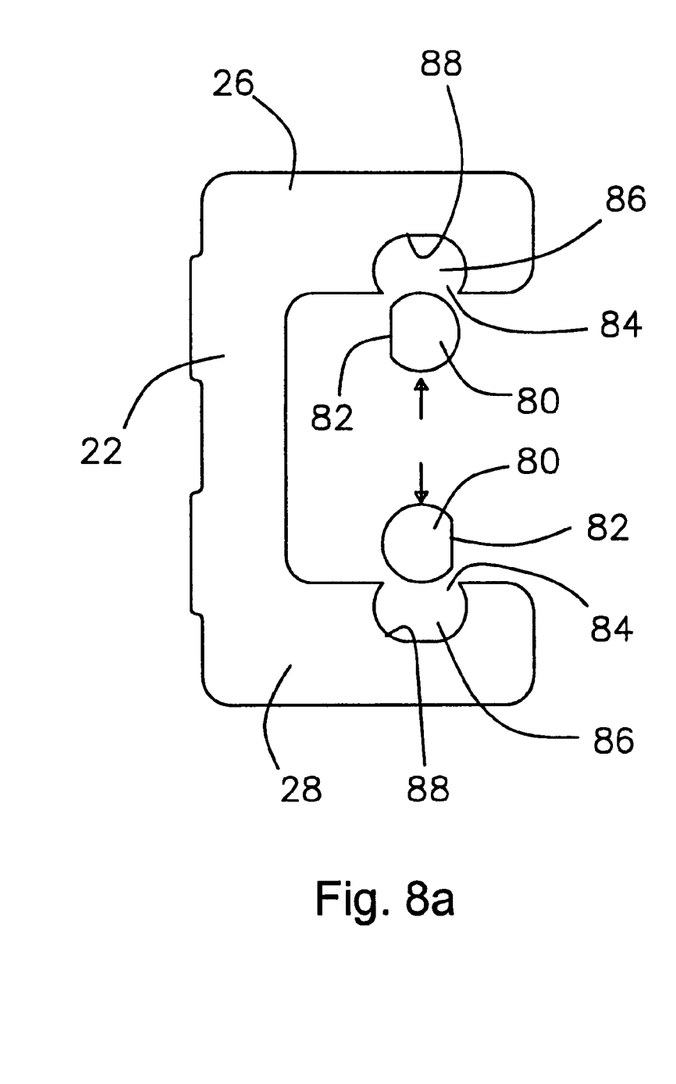
FIG. 8A is an end view of the rail prior to the insertion of the hardened metal raceways.
Figure 8B:
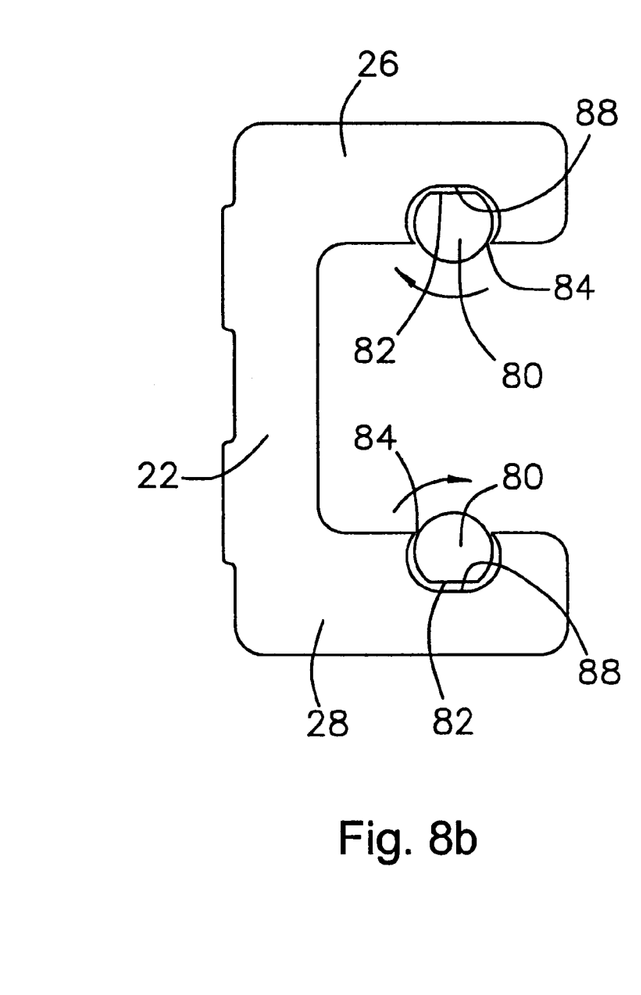
FIG. 8B is an end view of the rail after insertion of the hardened metal raceways.
Figure 9A:
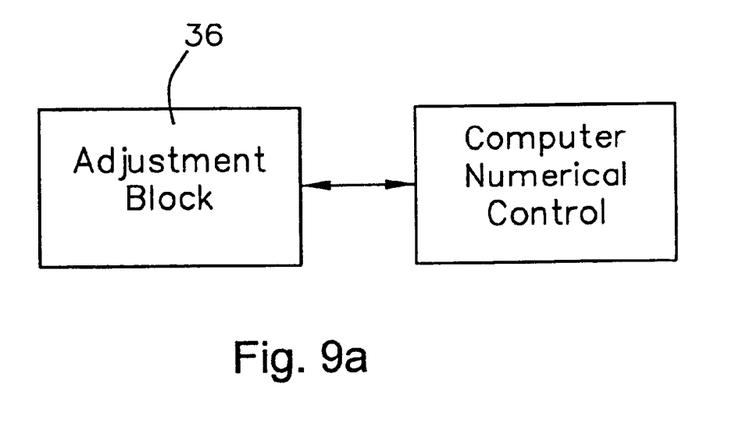
FIG. 9A is a diagram illustrating another embodiment of the present invention.
Figure 9B:
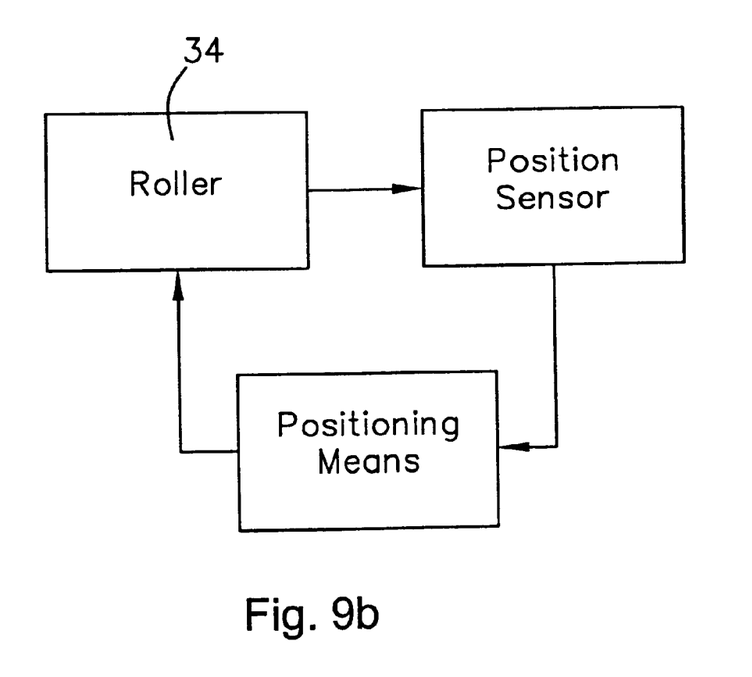
FIG. 9B is a diagram illustrating yet another embodiment of the present invention.
Figure 9C:
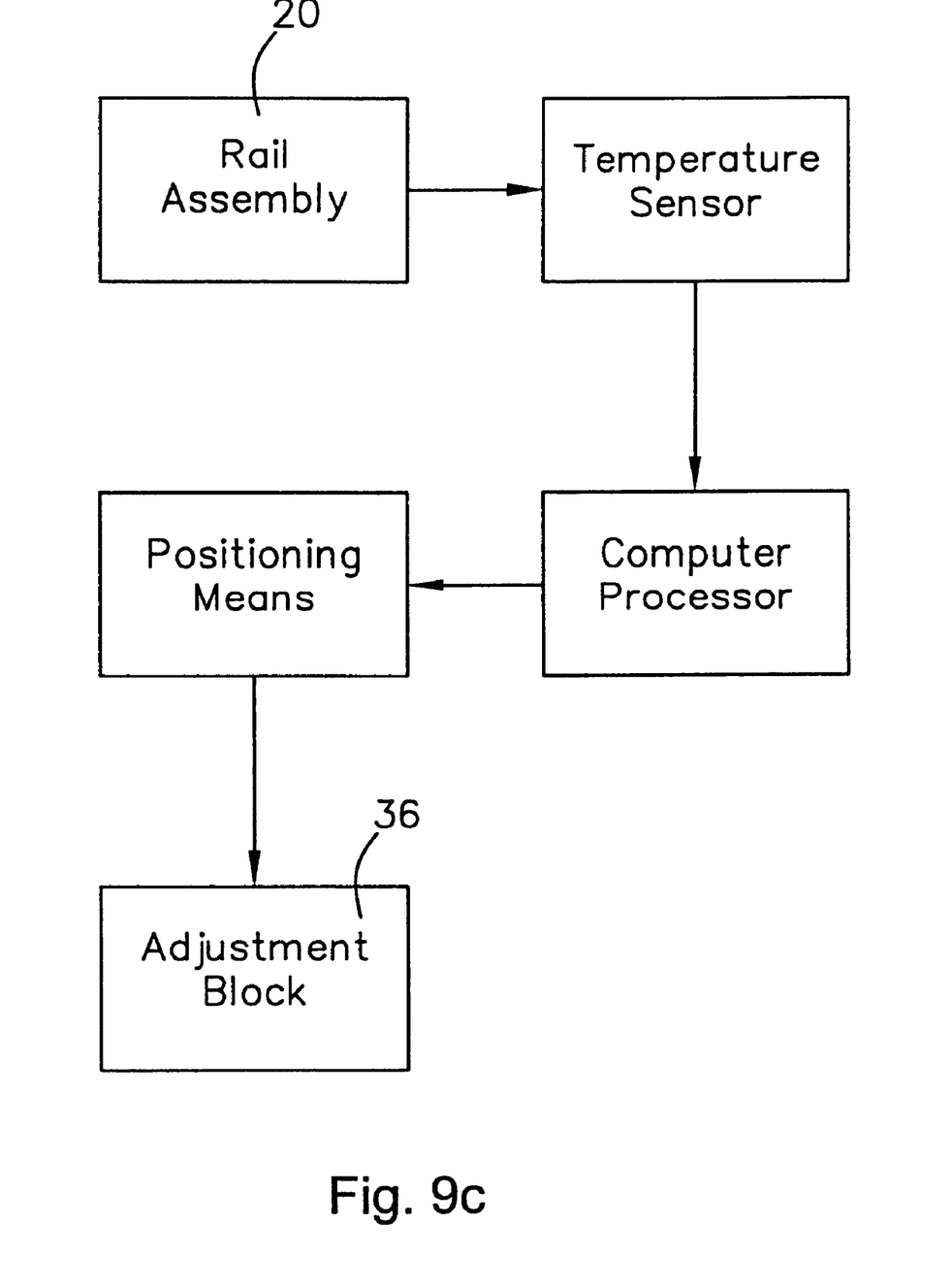
FIG. 9C is a diagram illustrating still another embodiment of the present invention.

However, to efficiently and economically manufacture the present invention, FIGS. 8A and 8B depict the manner in which raceway inserts 80 are inserted into rails 22 in the preferred embodiment. As can be seen, inserts 80 are substantially cylindrical but do include a flattened surface 82 such that the diameter of the insert 80 proximate the flattened surface 82 is less than the opening 84 provided in linear rail 22 to channel 86. In addition, the diameter of channel 86 is larger than the diameter of raceway insert 80 even at its largest point to ensure that raceway insert 80 can fit within channels 86. By viewing FIGS. 8A and 8B, it can be readily seen by one of ordinary skill in the art that by rotating raceway insert 80 after insertion into channel 86, the flattened surface 82 can be made to lie against the base 88 of channel 86 with narrowed opening 84 retaining the raceway 80 therein.

In further alternative embodiments, the present invention can be adapted to provide a sensor to detect the actual position of upper raceway 26 and lower raceway 28 and adjust the position of rollers 30 accordingly. In addition, a temperature sensor, such as a thermocouple can be used to monitor the temperature of raceways 26 and 28 as well as that of rollers 30 to position the rollers 30 based on thermal expansion such that slider body 24 traverses along a substantially uniform plane.

Figure 4:
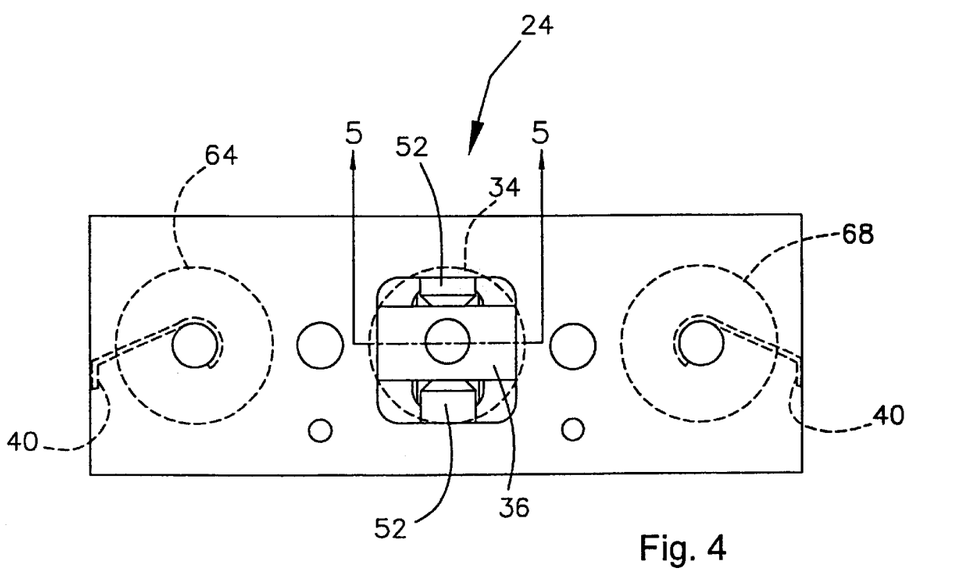
FIG. 4 is a side view of the slider body.
Figure 10:
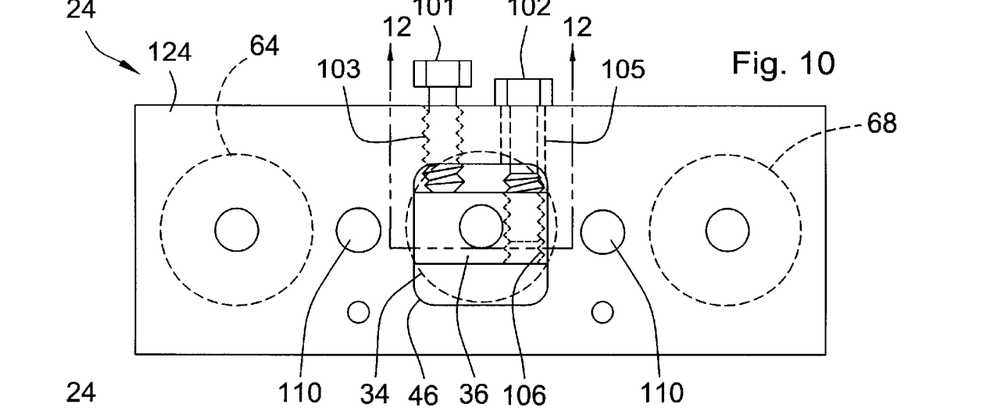
FIG. 10 is a side view of an alternate embodiment of the present invention.
Figure 11:
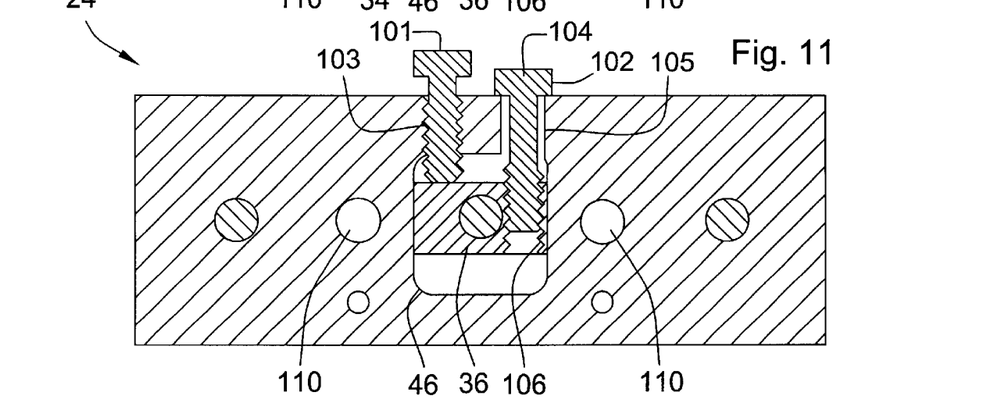
FIG. 11 is a cross-sectional side view of the slider body shown in FIG. 10.
Figure 12:
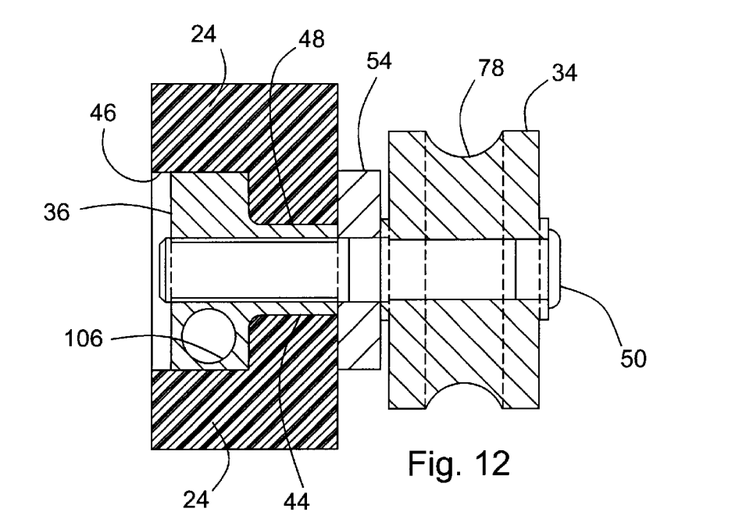
FIG. 12 is a cross-sectional view of the slider body taken along line 12–12 of FIG. 10.

FIGS. 10–12 represent another alternate embodiment of the present invention. While similar to the previous embodiments, the present embodiment provides an alternate mechanism for adjusting and fixing the position of the adjustment block 36 which mounts a roller 34 to the slider body 24, and also makes clear that biasing means such as the mechanical springs 40 are not required to employ the present invention. A unique feature of the present invention is that while the adjusting means provide highly accurate positioning of the roller 34, the adjusting mechanism (such as set screws 52 depicted in FIGS. 2 and 4) is accessible from the top and bottom surface of the slider body 24. Therefore, when a platform or other item is attached to the side of the slider body 24 via mounting holes 110, the position of the roller 34 may be still be adjusted because the adjusting mechanism remains accessible from the top and bottom. It may also be desirable to provide access to the adjusting mechanism from only one side, i.e. the top or bottom sides, of the slider body 24.

Accordingly, FIGS. 10–12 represent an alternate embodiment of the present invention wherein the mechanism for adjusting the block 36 and roller 34 are provided from one side, namely the top side of the slider body 24. As shown in the side view of FIG. 10, a pair of threaded bolts 101, 102 provide adjustment of the adjustment block 36 and hence roller 34 which is attached thereto. As with the set screws 52 of prior embodiments, the bolts 101, 102 exert opposing forces on the adjustment block 36 and roller 34 to adjust the position of the roller 34 relative to the upper and lower raceways 26, 28. As depicted in the Figures, bolt 101 exerts a downward vertical force on the adjustment block 36, while bolt 102 exerts an upward vertical force on the adjustment block 36. More specifically, bolt 101 threadingly engages the slider body 24 through tapped hole 103 which extends from a top surface 124 of the slider body 24 downwardly into the notch 46 which houses the adjustment block 36. A downward end of the bolt 101 engages the top side of the adjustment block 36 such that when the bolt 101 is turned clockwise, screwing the bolt 101 into the slider body 24, the bolt 101 induces a downward force on the adjustment block 36 and hence roller 34.

Bolt 102 induces an upwardly and vertically directed force on the adjustment block 36 in opposition to the downward force of bolt 101. To these ends, bolt 102 does not threadingly engage the slider body 24, but includes a head 104 which is larger than an aperture 105 formed in the slider body 24. The aperture 105 connects the upper surface 124 with the internal notch 46. A bottom end of the bolt 102 includes threads which cooperate with the threaded hole 106 formed through the adjustment block 36. As the bolt 102 is rotated clockwise, the head 104 of the bolt engages the top surface 124 of the body 24, while the threads engage threaded aperture 106 and pull the adjustment block 36 upwardly. Accordingly, the two bolts 101, 102 may be rotated, either in sequence or at the same time, to vertically adjust the position of the block 36 and roller 34 within the notch 46, by virtue of opposing upwardly and downwardly directed vertical forces.

For example, to adjust the roller 34 upwardly, bolt 101 may be loosened to eliminate the downward force on block 36 and provide some vertical clearance. Then, bolt 102 may be rotated to induce further upward vertical force on the block 36 moving the roller 34 upwardly until it reaches the desired position, typically engaging the upper raceway 26 of the rail 22. Finally, bolt 101 may be retightened to engage the block 36 and induce an equal and opposite downward vertical force on the block 36 to firmly fix its position within the notch 46, and hence the position of roller 34 within the rail 22. Therefore, bolts 101 and 102 are capable of adjusting the position of the roller 34 while remaining accessible from one side, illustrated as the top side, of the slider body 24. Therefore, the linear rail system may be adjusted even while a platform or other item is attached to the slider body 24 or slider bodies, and the system may be easily accurately pre-loaded.

From the foregoing, it can therefore be seen that the present invention provides a new and improved linear slide system with an apparatus for adjusting the preload on the slider body rollers. By adequately adjusting the preload, the slider body will be assured of maintaining a proper plane during operation even if subjected to substantial loads. In addition, by mounting at least one of the rollers using a biasing means, the slider body will be able to handle substantial shock loads as the slider body traverses across linear rail. Moreover, the provision of hardened metal raceway inserts assist with the parallelism of the upper and lower raceways over time.

What is claimed is:

1. A sliding rail assembly comprising:
    an elongated channel having upper and lower raceways;
    a slider body adapted to translate along the channel;
    a first roller attached to the slider body and being vertically adjustable relative to the slider body;

a first positioning member connected to the slider body and positioned to selectively engage the first roller and place a first vertical force thereon to vertically adjust the first roller; and a second positioning member connected to the slider body and positioned to selectively engage the first roller and place a second vertical force thereon, the second vertical force opposing the first vertical force.

2. The rail assembly of claim 1, wherein the first and second positioning members places equal and opposite vertical forces on the first roller to fix the position of the first roller.

3. The rail assembly of claim 1, further comprising a second roller connected to the slider body and positioned to engage the lower raceway.

4. The rail assembly of claim 3, wherein the first positioning member engages and positions the first roller against the upper raceway.

5. The rail assembly of claim 1, wherein the first positioning member comprises a set screw threadingly engaging the slider body to selectively engage the first roller.

6. The rail assembly of claim 1, wherein the first and second positioning members each comprise threaded fasteners operatively connected to the slider body to selectively engage the first roller.

7. The rail assembly of claim 1, wherein the first and second positioning members each comprise threaded fasteners operatively connected to the slider body to selectively engage the first roller.

8. The rail assembly of claim 1, wherein the first and second positioning members are both accessible from one of an upper and lower surface of the slider body.

9. The rail assembly of claim 1, wherein the first positioning member is accessible from a lower surface of the slider body, and wherein the second positioning member is accessible from an upper surface of the slider body.

10. A mechanism for adjusting the position of a roller relative to a linear rail having first and second opposed raceways, the linear rail defining a longitudinal axis, the mechanism comprising:

a slider body adapted to move relative to the linear rail along the longitudinal axis;

a first roller connected to the slider body and adjustable relative to the slider body along a first axis transverse to the longitudinal axis; and means for positioning the first roller along the first axis, the positioning means placing two opposing forces on the first roller to position the first roller along the first axis.

11. The mechanism of claim 10, wherein the two opposing forces are unequal when adjusting the position of the first roller and are equal when the position of the first roller is fixed.

12. The mechanism of claim 10, wherein the roller is pivotally connected to the slider body and rotatable about a second axis mutually transverse to the first axis and longitudinal axis.

13. The mechanism of claim 10, wherein the first roller is connected to a block fitted within a groove of the slider body, the groove generally parallel with the first axis, the block adapted to slide within the groove, and wherein the positioning means place opposing forces on the block to position the block within the groove.

14. The mechanism of claim 10, wherein the position of the first roller is monitored and adjusted by computer numerical control.

15. The mechanism of claim 10, further comprising a second roller connected to the slider body and positioned to engage the second raceway, the first roller positioned along the first axis to engage the first raceway.

16. The rail assembly of claim 10, wherein the positioning means is accessible from one side of the slider body.

17. A sliding rail assembly, comprising:

an elongated channel having upper and lower parallel raceways, the channel defining an elongated axis;

a slide adapted to linearly translate along the channel;

a first roller attached to the slide and engaging the lower raceway;

a second roller attached to the slide, the second roller vertically adjustable and engaging the upper raceway to facilitate the linear translation of the slide; and means for adjusting the position of the second roller relative to the raceways, the adjusting means placing a vertical force on the second roller.

18. The rail assembly of claim 17, wherein the adjusting means places equal and opposite vertical forces on the second roller to fix the position of the second roller.

19. The rail assembly of claim 17, wherein the adjusting means comprises a threaded fastener operatively connected to the slide and selectively engaging the second roller to vertically adjust the second roller.

* * * * *

UNITED STATES PATENT AND TRADEMARK OFFICE
CERTIFICATE OF CORRECTION

PATENT NO. : 6,450,687 B1
DATED : September 17, 2002
INVENTOR(S) : Robert Schroeder and Anthony P. LaMarca, Sr.

It is certified that error appears in the above-identified patent and that said Letters Patent is hereby corrected as shown below:

Column 7,
Line 25, replace Claim 7 with the following paragraph:

-- The rail assembly of claim 1, further comprising a block fitted within a vertical groove in the slider body, the first roller attached to the block, the first positioning member selectively engaging the block to place a vertical force thereon to vertically position the first roller. --

Signed and Sealed this

Seventeenth Day of December, 2002

JAMES E. ROGAN
*Director of the United States Patent and Trademark Office*